Feb. 9, 1954 O. P. SCHADT 2,668,665
INCUBATOR
Filed Aug. 26, 1947 2 Sheets-Sheet 2
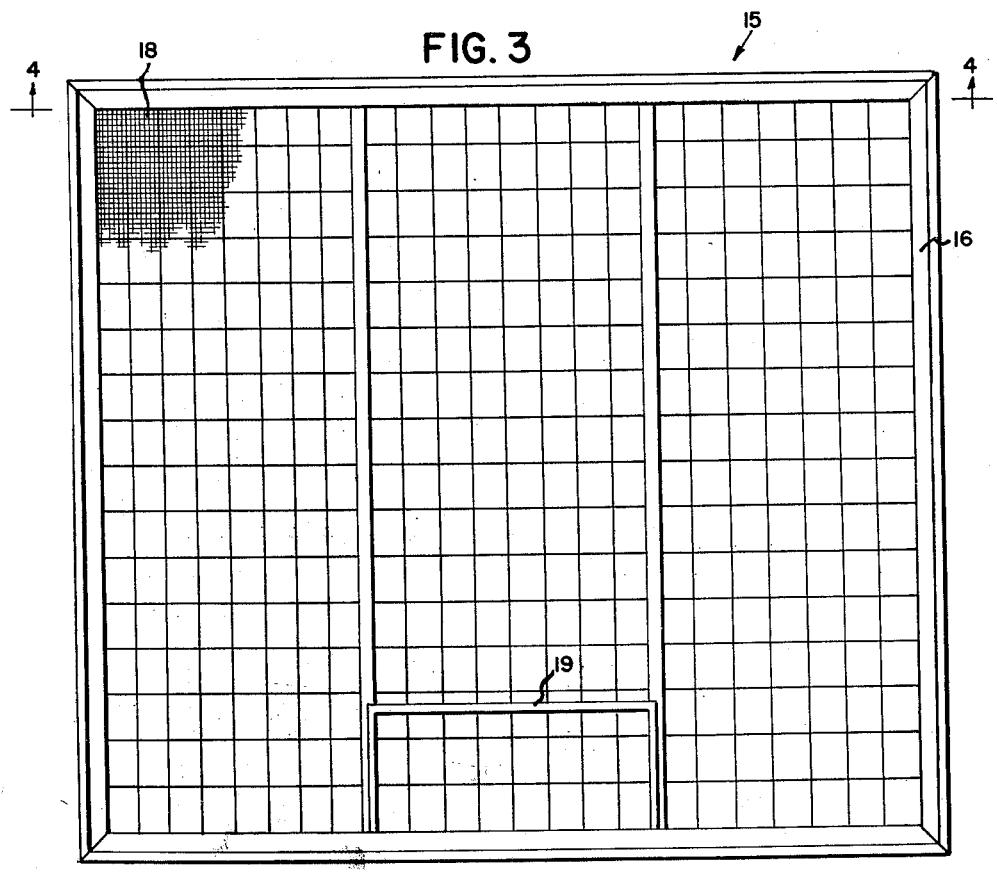
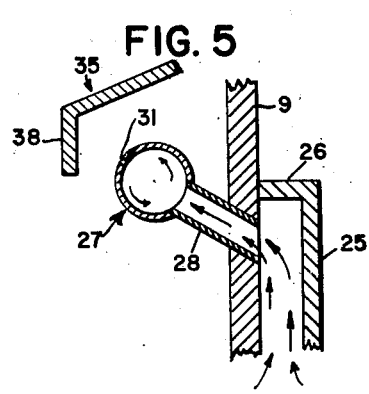
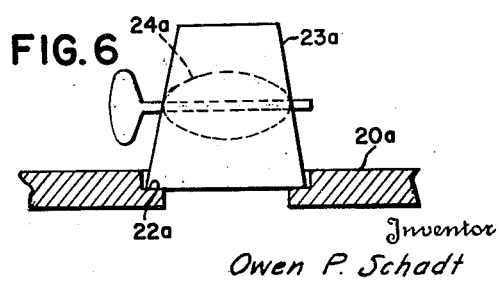
Inventor
Owen P. Schadt
By
Attorney Patented Feb. 9, 1954

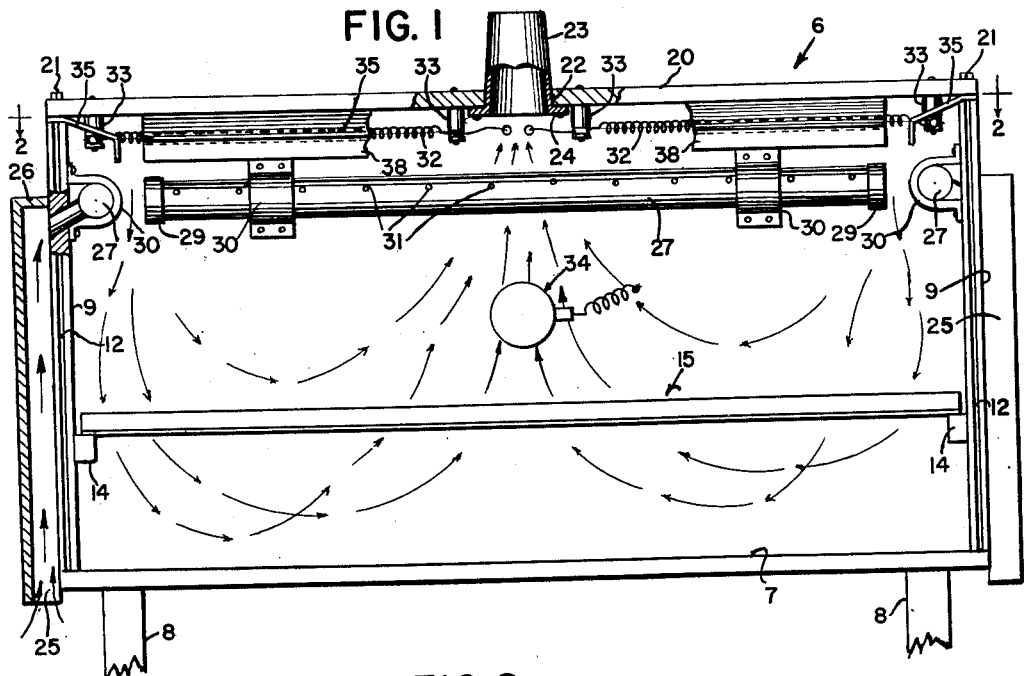

2,668,665

UNITED STATES PATENT OFFICE 2,668,665

INCUBATOR

Owen P. Schadt, Allentown, Pa., assignor to Horace J. Lichty, Easton, Pa.

Application August 26, 1947, Serial No. 770,689

2 Claims. (Cl. 237—14)

This invention relates to improvements in incubators for incubating chicken and other eggs by means of air heated and circulated within a box-like casing, and more particularly to an automatic thermosiphon air heating and circulating system for such incubators which is operative without the use of fans or other mechanical air circulating means and a primary object of this invention is to provide a device of this type which comprises a casing which is entirely closed against entrance therein of cool and unheated outside air, whereby no cool or unheated air can impinge upon the eggs supported therein, and wherein a thermodynamic circulating system is incorporated which not only precludes cool air zones in the casing, but predetermines the volume and rate of flow of uniformly heated air and its circulation throughout the casing, in such a way as to eliminate the need for and the disadvantages of air circulating fans and the like.

Another primary object of this invention is to provide an incubator of the character indicated above in which the thermodynamic air circulating means comprises air heating and distributing reservoirs having heating means adjacent thereto, positioned along the inside of the casing side walls, and receive and heat relatively large amounts of unheated air drawn from outside of the casing through restricted air intake means communicating only with the reservoirs, in such a way that the air in the reservoirs is quickly and uniformly heated and stored therein in relatively large quantities, and discharged therefrom into the interior of the casing through inwardly facing restricted discharge orifices so as to circulate within the casing at a predetermined rate.

A further primary object of this invention is the provision of an incubator of the character indicated above, in which the air heating and distributing reservoirs are horizontally arranged on the casing sidewalls, with the heating elements arranged along the upper sides of the reservoirs, with deflectors arranged directly above the heating elements and the reservoirs in such manner that the uniformly hot air issuing from the discharge orifices of the reservoirs is deflected inwardly and downwardly along the casing side walls and into the corners of the casing, whereby a uniform incubating heat is achieved and maintained throughout the interior of the casing, which eliminates cold spots and achieves uniform incubation of the eggs supported in the casing on an egg tray on a level below the reservoirs.

Other important objects and advantageous features of this invention will be apparent from the following description and the drawings appended thereto, wherein, for purposes of illustration only, a presently preferred embodiment is set forth in detail.

In the drawings—

Figure 1 is a side elevation with the removable front wall removed and partly in section.

Figure 2 is a contracted top plan view with the cover removed taken along the line 2—2.

Figure 3 is an enlarged plan view of the egg tray.

Figure 4 is a section taken on the line 4—4 of Figure 3, and

Figure 5 is a fragmentary vertical transverse section on an enlarged scale showing an alternative mounting of the deflector.

Figure 6 is a fragmentary vertical transverse section showing an alternative arrangement of a damper equipped air outlet tube.

Referring in detail to the drawings, the herein illustrated incubator comprises a closed substantially square casing 6, of suitable material, such as wood, consisting of a bottom 7, which may be supported from a floor by legs 8, opposed sidewalls 9, 9, a back wall 10, and a removable front wall 11, which, as shown in Figure 2, may have vertical tongues 12 engageable in grooves 13 in the front edges of the sidewalls 9, 9 to provide an airtight joint when the removable front wall 11 is held in place by suitable means (not shown). A handle 11' is provided for opening a lower hinged part (not shown) of the front wall 11 to provide access to the interior of the casing 6 for placing and removing eggs from the tray 15.

As shown in Figure 1, the casing 6 is wider than it is tall. At a distance of about one-third or more of the height above the bottom 7 the casing sidewalls 9, 9 are provided with brackets 14 upon which the removable wire mesh egg tray 15 is supported. The egg tray comprises a bevelled frame 16 (as shown in Figure 4) of suitable material, such as wood, in whose inner groove 17 are secured the edges of a wide-mesh screen or grating 18, to provide for free circulation of heated air around the eggs in all directions, including upwardly, from the region of the casing bottom 7. A trap door 19 may be provided in the front part of the egg tray to facilitate reaching the eggs from beneath the egg tray when desired.

The upper end of the casing 6 is closed by the removable cover 20 which seats upon the upper edges of the sidewalls 9, 9, back wall 10, and front wall 11, and is held in place by screws or the like 21 preferably located at the corners of the casing. The top 20 is provided at its center with a circular opening 22, up through which is inserted a frustro-conical air outlet tube 23 having a flange 24 secured to the underside of the top 20, as shown in Figure 1. The diameter of the air outlet tube 23 is gauged to provide for the escape of heated air from the interior of the casing 6 in the desired volume and rate, as hereinafter further explained.

An alternative form of air outlet arrangement, shown in Figure 6, includes an opening having a shoulder 22a, with a frustro-conical tube 23a removably seated therein and provided with a butterfly type manual damper 24a which can be readily adjusted to control the flow of air through the casing.

The entrance of outside air into the casing 6 takes place exclusively through vertical air intake ducts or flues 25 which are mounted on the outside of the sidewalls 9, 9 and the back wall 10 at points intermediate the ends of these walls. The ducts shown are of laterally elongated rectangular cross section and have their lower ends positioned below the casing bottom 7, as shown in Figure 1, and open to the atmosphere, with their upper ends spaced from the top of the casing and closed, as indicated at 26 in Figure 5.

As shown in Figure 2, the upper portions of the interiors of the ducts 25 are in communication with the heated air reservoirs 27 by means of tubes 28 which slant downwardly and outwardly from the middle of the reservoir and pass through the casing wall into the ducts. The tubes 28 may conveniently be integral with and act as brackets for mounting the reservoirs on the casing walls.

Each reservoir 27 consists of a horizontal tube of sufficient diameter to contain and store a substantial volume of heated air, the ends of the reservoirs being capped and closed, as indicated at 29.

If desired strap brackets 30 secured to the inner sides of the casing walls, may be used to fixedly support the reservoirs 27 horizontally along the casing walls at a height somewhat below the top or cover 20, leaving sufficient space thereabove for the heating elements and deflectors. Each reservoir is provided with a horizontal row of small, relatively widely spaced heated air discharge holes 31, which are gauged in number and diameter to predetermine the volume and rate of heated air discharged therefrom. The row of discharge holes 31 is placed at a suitable point at or above the horizontal median of the reservoir so as to project the discharged heated air slightly upwardly and toward the center of the casing 6, and against the deflecting means which overlies the reservoir.

The means for heating the reservoirs 27 consists of suitable electrical heating elements, such as coils 32 positioned parallelly above the reservoirs and stretched between suitably spaced insulators 33 secured to and depending from the removable cover 20, or alternatively, as indicated in Figure 2, secured to and projecting inwardly from the casing walls. The heating coils 32 are electrically connected together and the wires are led therefrom through suitable openings in the casing backwall 10 and connected to a thermostat 34 exposed on the interior of the casing, as shown in Figures 1 and 2, to which a suitable source of electric current (not shown) is to be connected for energizing the heating coils.

Overlying and coextensive with the heating coils 32 along the front wall, back wall, and sidewalls of the casing 6, are deflectors 35, preferably of sheet metal, having horizontal flanges 36 which rest upon the upper edges of these walls and are secured thereon by suitable means indicated at 37. The deflectors include straight, plane plate-like portions which extend inwardly from the walls to a point inwardly beyond the heating coils 32 as shown in Figure 2, at such a downward and inward angle as will procure the desired concentration of the heat from the coils 32 upon the reservoirs, and, deflection of the heated air discharged from the reservoirs 27 in a downward direction along the walls of the casing 6 and toward the center of the casing. The inward edges of the deflectors 27 may be provided with depending edges or flanges 38, which aid the deflectors in concentrating the heat generated by the heating coils 32 upon the reservoirs 27, so that quicker and more uniform heating thereof is obtained, and augment the controlled deflection of the heated air issuing from the reservoir discharge holes 31. The front and back deflectors may extend the full length or width of the casing, with the side deflectors shortened to meet the front and back deflectors at the corners of the casing, or if desired, the side deflectors may extend full length in the same way, in which case the front and back deflectors will be shortened. The extension of the deflectors into the corners of the casing prevents the formation of cold air pockets in the corners and aids the desired circulation of heated air in the casing.

From the foregoing it will be apparent that with the top or cover 20 and the front wall 11 in place, the egg tray having first been put in position with eggs thereon and the heating coils 32 energized, the air reservoirs 27 will be heated so that the air therein becomes heated and expands and escapes through the discharge openings 31 into the interior of the casing. The air thus displaced from the reservoirs 27 has its place taken by cool outside air rising through the ducts or flues 25, whereby an automatic and continuous thermodynamically produced circulation of air takes place according to well known principles. Cool outside air continuously moves upwardly through the ducts 25, from the atmosphere outside of the casing 6, and into the heated reservoirs 27 wherein it is heated and discharged into the casing at a rate and in a volume commensurate with and determined by the degree of heat applied, the proportioning of the parts involved, and the adjustment of the damper 24a where such is employed. The thermostatic switch 34 automatically cuts off the current supply to the heating coils 32 when the internal temperature of the incubator rises above a set point, and automatically turns on the current supply when the temperature drops.

As indicated by the arrows in Figure 1, the heated air is discharged from the holes 31 in the reservoirs 27 with sufficient force so that it is deflected downwardly along the sides of the casing 6 by the deflectors 27, with the result cool spots in the corners or along the sidewalls of the casing exist, and a uniform flow of properly heated air reaches of the eggs (not shown) on the tray 15. The natural flow of the heated air and the deflection thereof by the deflectors 27 assures that after passing downwardly to the region of the egg tray 15 the air will move toward the center of the casing 6, and rise to the centrally located outlet 23 and pass out into the outside atmosphere above the casing 6, thereby providing and maintaining the controlled scheme of continuous and uniform hot air circulation disclosed herein, which procures, as will be evident, uniform and efficient incubation of the eggs on the tray 15.

What is claimed is:

1. In a device of the character described, a closed casing comprising side walls and a top wall, horizontally elongated air reservoir means extending along the inner side of an upper part of a side wall and spaced below said top wall, heater means mounted on said casing and positioned along the side wall above said air reservoir means for heating said reservoir means, deflector means mounted on said casing and positioned along the said side wall and above said heater means for directing heat from said heater means downwardly onto said air reservoir means, said reservoir means having heated air discharge means at the laterally inward side thereof for discharging heated air from said air reservoir means toward the center of said casing, air outlet means in the center of said top wall for exhausting air from the interior of the casing on a level above said deflector means, and vertical conduit means mounted on the exterior of said side wall and exposed to the atmosphere outside of the casing, said conduit means having a lower end open to the atmosphere outside of the casing at a level below said air reservoir means and an upper end communicating solely with the interior of said air reservoir means.

2. In a device of the character described, a closed casing comprising side walls and a top wall, horizontally elongated air reservoir means extending along the inner side of an upper part of a side wall and spaced below said top wall, heater means mounted on said casing and positioned along the side wall above said air reservoir means for heating said reservoir means, deflector means mounted on said casing and positioned along the said side wall and above said heater means for directing heat from said heater means downwardly onto said air reservoir means, said reservoir means having heated air discharge means at the laterally inward side thereof for discharging heated air from said air reservoir means toward the center of said casing, air outlet means in the center of said top wall for exhausting air from the interior of the casing on a level above said deflector means, and vertical conduit means mounted on the exterior of said side wall and exposed to the atmosphere outside of the casing, said conduit means having a lower end open to the atmosphere outside of the casing at a level below said air reservoir means and an upper end communicating solely with the interior of said air reservoir means, said deflector means having a depending portion spaced laterally inwardly from said air reservoir means and depending below the level of said heated air discharge means for directing the discharged heated air in a downward direction, in the interior of the casing.

OWEN P. SCHADT.

References Cited in the file of this patent

UNITED STATES PATENTS

| Number | Name | Date |
| --- | --- | --- |
| 258,295 | Halsted | May 23, 1882 |
| 719,614 | Sauer | Feb. 3, 1903 |
| 846,154 | Sprague | Mar. 5, 1907 |
| 927,711 | Charles | July 13, 1909 |
| 965,837 | Reed | July 26, 1910 |
| 1,218,293 | Mills | Mar. 6, 1917 |
| 1,407,671 | Pope | Feb. 21, 1922 |
| 1,775,481 | Bartlett et al. | Sept. 9, 1930 |
| 1,922,086 | Hart | Aug. 15, 1933 |
| 1,974,116 | Martin | Sept. 18, 1934 |
| 2,061,712 | Martin | Nov. 24, 1936 |

FOREIGN PATENTS

| Number | Country | Date |
| --- | --- | --- |
| 235,333 | Great Britain | June 18, 1925 |